United States Patent [19]
Bremer

[11] 3,752,614
[45] Aug. 14, 1973

[54] ADJUSTABLE EXTRUSION HEAD
[75] Inventor: Sherman L. Bremer, Tempe, Ariz.
[73] Assignee: Bremertron KL Corporation, Tempe, Ariz.
[22] Filed: Feb. 2, 1971
[21] Appl. No.: 111,911

[52] U.S. Cl. ............................... 425/113, 425/466
[51] Int. Cl. .................................. B29c 27/14
[58] Field of Search .................... 425/113, 381, 466, 425/467

[56] References Cited
UNITED STATES PATENTS
2,626,427  1/1953  Brown ............................... 425/113
2,760,230  8/1956  Van Riper ..................... 425/113 X
2,766,481  10/1956  Henning ......................... 425/113 X
3,538,547  11/1970  Drabb ............................... 425/113
3,649,730  3/1972  Benteler et al. ................. 425/113 X Primary Examiner—R. Spencer Annear
Attorney—Anderson, Luedeka, Fitch, Even and Tabin

[57] ABSTRACT

An extrusion head for forming insulated wire includes a fixed threaded hollow mandrel and a threaded hollow pin disposed internally of and in mating engagement with the mandrel for supporting a male die member in axial alignment with a female die member mounted within the head. The threaded portions of the mandrel and the pin are so engaged that rotation of the pin within the mandrel advances or retracts the male die member with respect to the female die member while maintaining the alignment therebetween.

4 Claims, 5 Drawing Figures

Patented Aug. 14, 1973

INVENTOR
Sherman L. Bremer

Anderson, Luedeka, Fitch, Even & Tabin
ATTYS

Patented Aug. 14, 1973

INVENTOR
Sherman L. Bremer

Anderson, Luedeka, Fitch, Even & Tabin
ATTYS.

ADJUSTABLE EXTRUSION HEAD

The present invention relates to the extrusion of plastic material through a die and, more particularly, to an adjusting unit for an extrusion head.

In conventional systems for extruding plastic material through a die onto a continuously moving wire or filament, such as in the production of insulated wire or cable, plastic material in granulated or pelletized form is contained in a storage hopper from which it is transported under high pressure past a plurality of heaters defining a temperature gradient to form a melt. The melt is then delivered to an extrusion head, and there the molten plastic material is directed through an aperture in a fixed female die member. Axially aligned with the female die member is a male die member having an aperture through which the filament passes. In a space which is located between the male and female die members the plastic melt surrounds the filament and is drawn under pressure through the female die member, the plastic melt forming a concentric sheath about the filament.

In forming insulated wire by extrusion methods, cross-linkable polyethylene and other thermoplastics, including those having carbon black filler material, are conventionally employed. When these plastics are used, close watch over temperature and pressure in the extrusion head is necessary. If the temperature and pressure environment is not accurately controlled, cross-linkable polyethylene, for example, may prematurely cross-link while passing through the extruder, and for any thermoplastic, in general, the extruded insulation will not have the characteristics desired.

Various factors tend to make the control of such an extrusion system rather difficult to obtain a desired product in view of the critical nature of the process parameters and variations in material. Every lot of thermoplastic material generally differs in composition, there even being variations within a lot, and the speed of the moving filament must be varied or the extruder shut down to make adjustments which compensate for the changes in the composition. This is especially true where broad range molecular weight distribution plastics are used. Moreover, it is generally necessary to adjust the die to compensate for changes in wire coating thickness.

Heretofore, in the extrusion of plastic material onto a continuously moving filament, a typical adjusting unit for an extrusion head has consisted of a pair of adjusting screws carried at one end in a heavy plate mounted in cantilevered fashion to the end of a die pin and at the other end within a mandrel fixed to the extrusion head. As the screws are rotated with respect to the mandrel and the plate, the die pin moves within the mandrel to advance or retract the male die member fixed to the inner end thereof relative to the female die member.

However, such prior extrusion heads have generally presented a number of problems in connection with their adjustment, and have tended to create further difficulties in the extrusion process as particularly employed for insulated wire and cable coatings. For example, the heavy plate carrying the adjusting screws exerts a torque on the outer end of the die pin which tends to cause misalignment of the pin within the mandrel upon adjustment. Since the adjustment of both screws cannot readily be evenly accomplished to avoid the application of such torque to the pin, such misalignment generally occurs due to tolerance limitations and inadequate supporting structure which are believed to be inherent in such constructions. Since the various components of the extrusion head are conventionally formed of different metals having different temperature coefficients of expansion, the tolerances will vary at various temperatures, which is believed to make it very difficult to have a controlled close fit between the die pin and mandrel without binding or distortion. Moreover, even attempting precise tolerances leads to greatly increased manufacturing costs, and such precision may well be lost through normal use and handling of the die pin by factory personnel. This misalignment which typically occurs during adjustment leads to the eccentric disposition of the extruded insulation relative to the wire, and a large quantity of unsatisfactory insulated wire may be produced when such adjustment is attempted during the extrusion process. Additionally, wobble between the die pin and mandrel during such an adjustment may result in extruded plastic passing through the wire aperture and into the hollow bore or central portion of the die pin, necessitating the cleaning of the head.

Hence, heretofore, when the operator has found it necessary to make adjustments in an extruder, such as when changing plastic material, e.g. between cross-linkable polyethylene and another type of plastic, he has typically shut down the extruder, rather than use the conventional adjusting screws. This shut-down period requires a minimum of 45 minutes and typically runs to 90 minutes or more. During the shut-down period, the movement of the filament through the extrusion head is stopped and the extruder is purged of any remaining plastic material. After the head has been cleaned, reassembled and adjusted and the filament is again passed therethrough, plastic material is directed through the extrusion head. As the extruder again commences operation, the concentricity and the external diameter of the sheathed filament is measured to determine if the proper adjustment has been made, and if it has not, the extruder is shut down again.

When cross-linkable polyethylene is being extruded, the extruder is usually purged to make such minor readjustment. The extruder cannot be stopped for more than a short period of time because the pressure drops in the head and in the extruder, causing the material to cross-link prematurely. To accomodate these and other changes in the extrusion system, such as when reducing thickness of the coating on the wire, the operator typically passes the filament through the extrusion head at a speed less than the optimum, and adjusts the operating speed of the filament to that which provides the desired insulation thickness, rather than adjusting the die head. Although this is not always possible, where it avoids it avoids, the problems of purging the system, but results in slower extrusion speeds and inefficient production.

Accordingly, an object of the present invention is to provide an improved apparatus for continuously extruding plastic material upon a traveling filament or wire.

Another object of the invention is to provide an improved adjustable extrusion head for extruding a sheath upon a filament to form insulated electrical wire or cable.

Still another object of the invention is to provide an adjusting unit for an extrusion head whereby the spacing of the male and female die members of the head can be readily adjusted while the extrusion head is in operation to accomodate changes in material composition, insulation thickness, temperature and pressure.

Yet another object of the invention is to provide an improved extrusion head permitting rapid and simple adjustment so that insulated electrical wire of perfect concentricity can be readily produced.

These and other objects of the invention will become apparent with reference to the following detailed description and accompanying drawing, in which.

Figure 1:
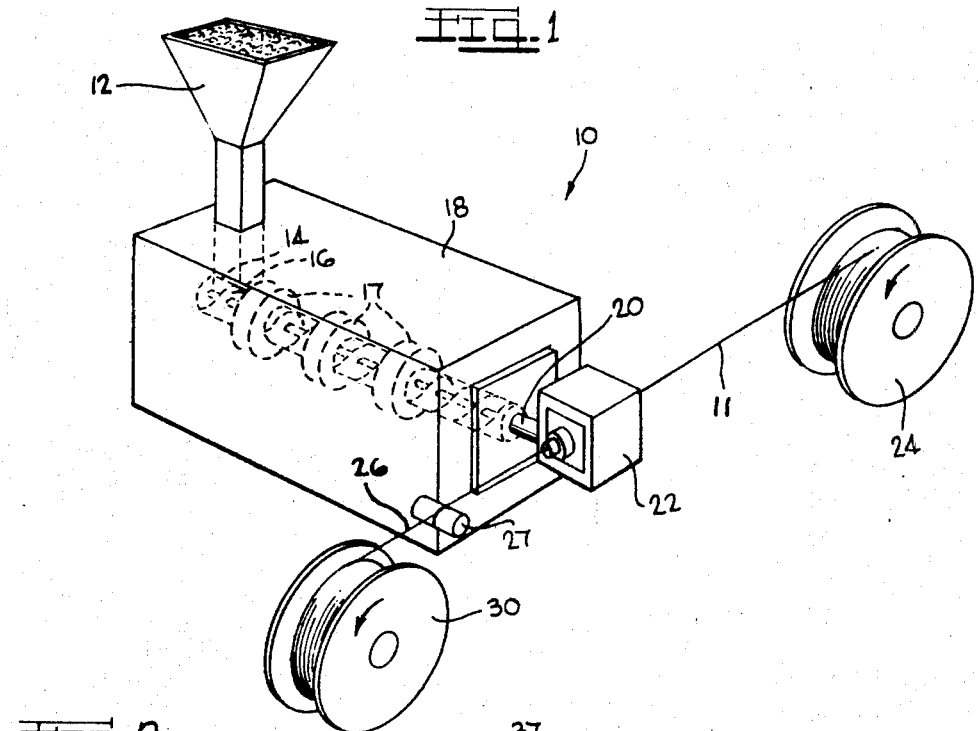
FIG. 1 is a diagrammatic perspective view of an extruder having an extrusion head therein.

Generally, and with reference to FIG. 1 of the drawing, there is shown a conventional system 10 for continuously extrusing plastic material about a traveling wire or filament 11, the system being particularly adapted to the production of insulated electrical wire or cable. The system includes a hopper 12 for containing extrudable plastic material in solid granulated or pelletized form, a barrel or conduit 14 in which there is disposed a feed screw 16 for transporting the plastic material from the hopper 12 under increasing pressure and a series of heaters 17 defining a plurality of zones for gradually increasing the temperature gradient of the plastic material. The screw 16 and the heaters 17 are contained with a housing 18 wherein the material is transformer into a melt. Connected to the housing 18 through a passageway 20 is an extrusion head 22 into which the filament 11 passes from a pay off reel 24, a sheath of plastic material being applied therearound (as at 26). The sheathed filament 26 upon leaving the extrusion head 22 generally passes through cooling units (not shown) and about driving capstan 27, and is then received by a take-up reel 30. A vulcanizer (not shown) may also be employed where the plastic is to be cured or cross-linked, as is well known to the art.

Figure 2:
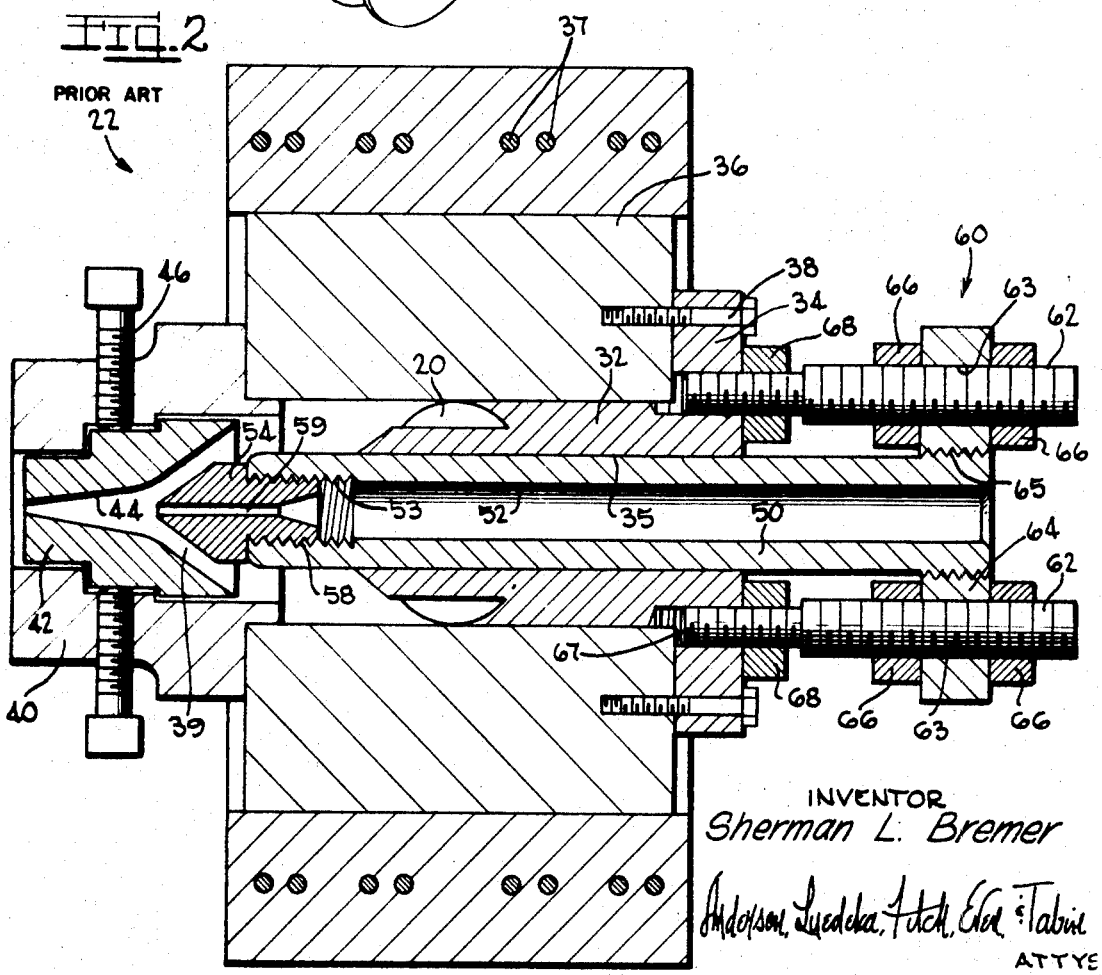
FIG. 2 is an elevational cross-sectional view of an extrusion head of a type commonly used in the art.
Figure 3:
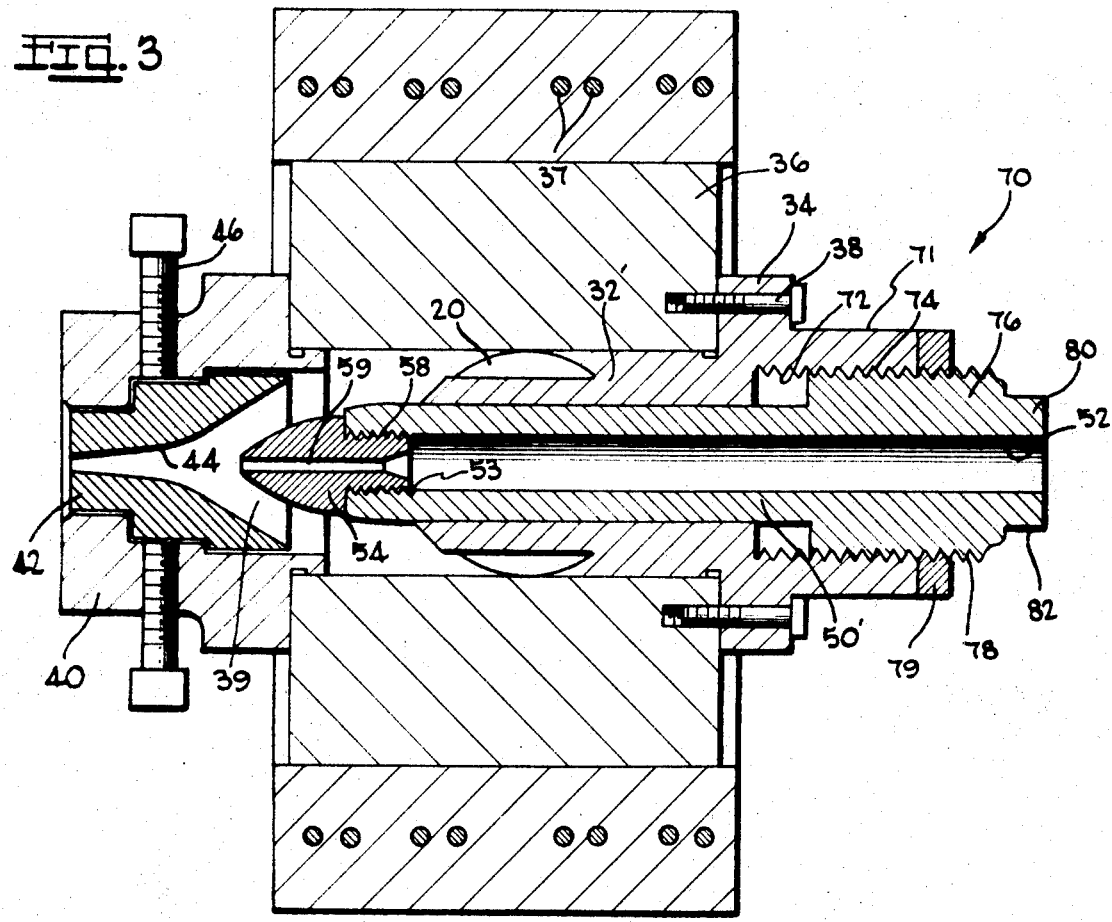
FIG. 3 is an elevational cross-sectional view of an extrusion head showing various of the details of the invention.

In FIGS. 2 and 3 of the drawing, various details are illustrated of a conventional extrusion head which may be employed as the head 22 of the system of FIG. 1. A hollow supporting mandrel 32 having an outwardly projecting flange 34 at the rear thereof and an opening 35 extending entirely therethrough is mounted to a head housing 36 in which resistance heating coils 37 are disposed by bolts 38 or other fasteners passing through the flange. The mandrel 32 extends substantially through the interior of the head housing 36; however, a space 39 is left adjacent the front end thereof. An apertured block 40 closes this space 39. The passageway 20 which connects the conduit 14 and the head 22 and through which the plastic melt passes terminates within the space 39, the plastic melt accordingly entering the head housing 36 within this space. Mounted within the block 40 and extending axially of the mandrel 32 is a female die member 42. The female die member 42 is provided with a tapered conical aperture 44 having its apex extending outwardly, the plastic melt being extruded through the aperture 44 about the moving filament 11. Holding the female die member 42 within the block 40 are a plurality of set screws 46 projecting through the block and abutting the exterior surfaces of the die member. These set screws 46 lock the female die member 42 within the block 40.

The mandrel 32 of the extrusion head 22 supports a hollow die pin 50 within its interior opening 35. The die pin 50 is located in close engaging relationship with the mandrel 32 and extends into the space 39, the pin 50 being mounted for movement with respect to the mandrel 32. The die pin 50 is provided with a bore 52 through which the filament 11 passes. At the inner end of the die pin 50, there is located an internally threaded portion 53 in which there is threadably inserted a male die member 54. To this end, the male die member 54 has an externally threaded portion 58 which mates with the internally threaded portion 53 of the die pin. The male die member 54 also has an axial aperture 59 therethrough and a tapered conical shape such that it corresponds to and extends partially within the female die member 42 with which it is axially aligned. It should be noted that the spacing between and alignment of the female and male die members 42 and 54 is of critical importance if a perfectly concentric and properly formed sheathed wire of the desired diameter is to be produced. Accordingly, it is desirable to provide apparatus for adjustably positioning the male die member relative to the female die member, or vice-versa, to provide the optimum space 39 between the die members to accomodate the particular type of plastic material employed and the temperature and pressure acting on the material to obtain the desired diameter and surface of the extruded product.

More particularly, there is illustrated in FIG. 2 an adjusting unit 60 of a type presently known and widely used in the art of extruding insulated wire and cable. Such an adjusting unit 60 generally includes a pair of diametrically spaced adjustment screws 62 respectively disposed through apertures 63 in an adjuster plate 64 mounted rearwardly of the head housing 36. The die pin 50 is provided with external threads at its outer end which engage and mate with an internally threaded bore 65 in the plate 64. The plate 64 is thereby supported by the die pin 50 in cantilevered fashion. A pair of lock nuts 66 mounted upon each adjustment screw 62 abut against both sides of the plate 64. At their inner ends, the adjustment screws project through threaded openings 67 in the mandrel 32 to bear against the head housing. Stop nuts 68 retain the inner ends of the adjustment screws 62 within the threaded openings 67. When the nuts 66 and 68 are loosened, the adjustment screws 62 can be rotated therein, and the plate 64, the die pin 50, and the male die member 54 slidably move within the mandrel 32 toward or away from the female die member 42.

It has been found that a system of adjusting an extrusion head such as that shown in FIG. 2 is not well suited for adjustment during operation to produce perfectly concentric and properly formed insulated wire or cable. Upon loosening the nuts 66 and 68 holding the adjusting screws 62, the die pin 50 will generally wobble and move the male die member 54 out of axial alignment with the female die member 42. As previously mentioned, this wobbling is in part due to the practical tolerances between the pin and the mandrel and the effect of the weight of the cantilever supported plate 64. The die pin 50 may also wobble within the mandrel 32 due to differences in heat-induced expansion of the elements. Typically, the die pin and the mandrel are formed of different materials, e.g. carbon steel and stainless steel, having different coefficients of expansion.

Additionally, the die head structure of FIG. 2 does not generally permit extrusion with relatively large die spacings 39 between th emale and female die members 54 and 42 because of the lack of adequate mechanical support to maintain die alignment from the adjustment screws 62 which are necessarily substantially backed out of the threaded openings 67 for such large spacings. This generally requires that such die head structures be operated with relatively close or small spacings between the die members and with relatively high head pressures such as, e.g., 2,500 to 3,500 psi. Under these conditions, and with a typical small ratio of die spacing to extruded wire diameter of 1.5 to 1, a substantial expansion of the polyethylene typically occurs on leaving the female die member. Because the amount of expansion varies significantly under these conditions with changes in plastic composition and other process parameters, the aforementioned problems associated with the necessity for head adjustment or for varying the operating line speed are augmented, making the control of the extrusion process even more difficult to consistently obtain a desired form of insulated wire.

Turning now to FIG. 3 of the drawing, there can be seen a novel and improved adjusting unit 70 for accurately adjusting the male and female die members while maintaining axial alignment, and for permitting extrusion with relatively large, as well as small die spacings. Certain of the other elements of the extruder head are substantially the same as the elements described above, and the modified elements have primed reference characters. In the embodiment of FIG. 3, the hollow supporting mandrel 32' is provided with an enlarged cylindrical flange portion 71 integral therewith having an axial bore 72 in the vicinity of the outer end thereof, and the flange 71 projects substantially outward from the rear of the head housing 36. Preferably, the enlarged bore 72 is provided with internal threads 74 and is of greater internal diameter than the remainder of the hollow mandrel. Correspondingly, the die pin 50' has an external boss 76 near the outer end thereof. Preferably also, the boss 76 is enlarged and has a greater external diameter than the remainder of the pin. The boss 76 is provided with external threads 78 which are adapted to engage and mate with the threads 74 in the bore 72 of the mandrel 32'. Thus, upon rotation of the pin 50' within the mandrel 32', the pin advances or retracts the male die member 54 at the inner end thereof relative to the female die member 42 associated with the housing 18. Because of the large area of engaging surface between the mandrel and the pin in the regions of adjustable mechanical connection, and the integral nature of the mandrel and supporting flange construction, a stable adjusting unit is provided which does not depend on the type of cantilevered support found in the prior structures hereinbefore described.

As the adjusting unit 70 is disposed axially of and concentric to the pin, the mandrel, and the male and female die members, the spacing of the male and female die members is readily adjustable without any wobble of the pin within the mandrel. In the illustrated embodiment, the pin 50' is supported symmetrically over its entire circumference, and allows substantially continuous and instantaneous adjustment of the position of the male die member when necessary to accomodate pressure, temperature, quality or composition changes in the plastic material extruded. The extruder can remain in operation during adjustments and need not be shut down and purged of plastic material when each small adjustment is being made. Also, the operator can obtain true concentricity and proper diameter of the extruded wire without resorting to variations in line speed, and thus the line can be run at full and optimum speed at all times.

Another important feature of the adjusting unit 70 of the present structure is that the male die member 54 can be spaced from the female die member 42 a relatively large distance, such as up to 7 times the diameter of the insulated wire 26 to be formed. As previously mentioned, in a conventional extruder head, the die members are typically spaced a distance of about 1½ times the diameter of a similar insulated wire. When the extruder is operated at greater spacing, the pressure in the space 39 is only about 900 at 1,200 psi, as opposed to the much higher pressure range of about 2,500 to 3,500 psi. Operating the extruder at such substantially lower pressure results in the plastic material which forms the sheath upon the filament having less memory effects or variations upon being extruded. Thus, less expansion of plastic material occurs, allowing the final diameter of the sheathed filament to be more easily controlled since it is then less sensitive to variations in composition and process parameters. Also, the extruded plastic material may have a more consistent density per unit area at any desired operating line speed. Under these conditions, for example, with the male and female die members spaced a greater distance apart and having such a 7:1 ratio, the line speed of the filament 11 is permitted to run to 150 feet per minute, as opposed to a maximum speed of about 65 feet per minute in conventional apparatus, for a coating of 0.060 inch polyethylene.

To rigidly secure the die pin 50' to the mandrel 32' after the male and female die members have been properly positioned, a lock nut 79 is provided. The lock nut 79 is threadably disposed about the boss 76 of the die pin 50' and abuts the outer end of the mandrel 32'. This prevents the die pin from rotating within the mandrel and thereby undesirably changing the spacing between the male and female die members during normal operation.

At the outer end of the die pin 50' and projecting beyond the boss 76 is an end nut portion 80 having a plurality of flats 82 around the periphery thereof. The flats 82 are adapted to be engaged by a wrench or other suitable tool for effecting the adjustment by rotating the die pin and hence advancing or retracting the male die member 54 relative to the female die member 42. Moreover, the nut portion 80 is dimensioned to fit within a vise or similar device upon removal of the die pin 50' from the extrusion head 22 so that the male die member 54 can be unscrewed from the die pin. In prior art devices (such as that shown in FIG. 2), the die pin 50 must be held in a central region intermediate the ends of the pin since there are threaded portions at the ends thereof. This tends to destroy any precision fit which may be sought between the pin and the mandrel because the use of a vise to hold the pin tends to roughen and deform its surfaces. This problem is obviated by the adjusting unit 70 of the present construction as only that portion 80 of the die pin 50 which projects outwardly from the rear of the mandrel 32' is engaged and subject to damage by a vise, and this portion in no way engages the mandrel.

Figure 4:
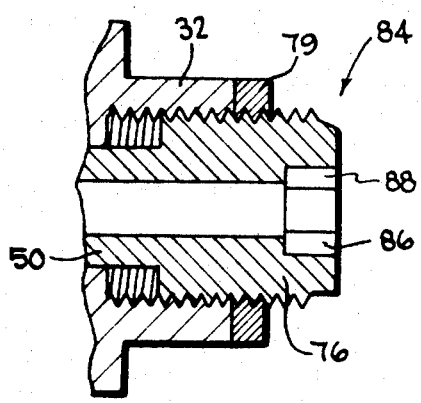
FIG. 4 is a partial cross-sectional elevational view of a modified embodiment of the extrusion head shown in FIG. 3.

In FIG. 4, there is shown another embodiment of the end portion of the adjusting unit 80. As an alternative to the end nut portion, an enlarged bore 86 having flats 88 around the periphery thereof is located at the outer end of the die pin 50'. The flats 88 are adapted to be engaged by a suitable tool to rotate the pin and consequently adjust the spacing between the male and female die members.

Figure 5:
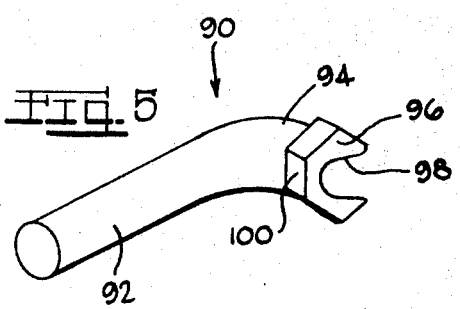
FIG. 5 is a perspective view of a tool useful with the embodiment shown in FIG. 4.

Although in the embodiment shown in FIG. 3, a wrench or other conventional tool is employed to rotate the die pin, a specially designed tool is preferable for this purpose when utilizing the embodiment shown in FIG. 4. To this end, a tool 90, as shown in FIG. 5, is employed which is similar in construction to an Allen wrench, except that it comprises a grooved aperture to permit adjustment of the die head during extruder operation. The tool 90 has a shank 92 with a transversely extending arm 94 at one end thereof. At the end of the arm 94 is a nut 96 having a groove 98 formed therein and a plurality of flats 100 around the periphery thereof. The nut 96 is dimensioned to fit within the enlarged bore 83 at the end of the die pin 50 such that the flats 100 of the nut engage the corresponding flats 84 in the die pin. The groove 98 permits the filament 11 to pass therethrough and into the hollow die pin 50' while the die pin is being adjusted.

In use of the adjusting unit 70 shown in FIG. 3, a wrench or similar tool is brought into engagement with the end portion 80 at the outer end of the die pin 50'. The lock nut 79 is loosened and the end portion 80 is rotated by the wrench. Rotation of the end portion 80 causes the die pin 50' to advance or retract within the mandrel 32'. The male die member 54 at the inner end of the die pin is thereby positioned the desired distance from the female die member 42 which is associated with the housing 18. Similarly, in the embodiment shown in FIG. 4, the die pin 50' is rotated upon insertion of the nut 96 at the end of the tool 90 within the enlarged bore 86. The adjustment of the spacing can be made in less than one minute and adjustments can be continuously made while the extruder is in operation. The extrusion line need not be shut down to accomodate a change in wire diameter, a change in the composition of the plastic material extruded, or a change in pressure or temperature within the extrusion head 22.

Although the adjusting unit 70 has been described as providing adjustment of the male die member 54 relative to the female die member 42, it should be apparent that the female die member could be moved relative to the male die member by employing a modified form of the adjusting unit 70. Furthermore, although the system has been described in conjunction with the production of insulated electrical wire, it should be apparent that the system is not limited thereto.

Thus, there is provided an improved apparatus for continuously extruding plastic material upon a traveling filament or wire. The apparatus comprises an adjustable extrusion head for extruding a plastic sheath upon a filament to form insulated electrical wire of exact concentricity and controlled diameter. Furthermore, the present apparatus includes an adjusting unit for the extrusion head which can be readily used to compensate for changes in the extruded plastic material, insulation thickness, or in the pressure or temperature of the system while the extrusion head is in operation.

While a form of the invention has been shown and described, various modifications could be made therein without departing from the scope of the invention.

Various features of the invention are set forth in the following claims.

What is claimed is:

1. An adjusting unit for an extrusion head having axially aligned male and female die members contained within a housing, comprising a mandrel secured to the housing, said mandrel having a threaded flange portion extending from the housing, a hollow pin disposed internally of and in mating, rotatable and axially movable engagement with the mandrel, the male die member being supported by one end of the pin and disposed adjacent the female die member, and said pin having a threaded portion in mating engagement with said threaded flange portion of the mandrel so that rotataion of the pin relative to the mandrel advances or retracts the male die member relative to the female die member while maintaining the die members in alignment, a lock nut mounted on the threaded portion of the pin and adapted to abut the outer end of said flange portion of the mandrel to secure the pin and the male die member against movement relative to the female die member, said threaded flange portion extending completely about the circumference of the mandrel, and said threaded portion of the pin and said threaded flange portion being of such dimensions to enable the male die member to be spaced from the female die member at least seven times the diemater of the extruded insulated wire.

2. An adjusting unit according to claim 1, wherein the flange portion of the hollow mandrel forms an enlarged interior space adjacent one end thereof, the threads being contained within said enlarged space, and the hollow pin has an enlarged exterior portion adjacent a second end thereof opposite the male die member, the threads of the pin being disposed on said enlarged portion.

3. An adjusting unit according to claim 2, wherein the hollow pin has an end portion provided with flats around the periphery thereof and projecting outwardly from the second end of the pin, the end portion being adapted for engagement by a tool for rotation of the pin.

4. An adjusting unit according to claim 2, wherein the hollow pin has an enlarged interior space adjacent the second end thereof and having flats around the internal periphery thereof disposed so that the pin can be engaged by a tool for rotation.

* * * * *

UNITED STATES PATENT OFFICE
CERTIFICATE OF CORRECTION

Patent No. 3,752,614        Dated August 14, 1973

Inventor(s) Sherman L. Bremer

It is certified that error appears in the above-identified patent and that said Letters Patent are hereby corrected as shown below:

Title page, name of stated Assignee should be --Bremertron XL Corporation--.
Column 2, line 53, "avoids" (first occurrence) should be --applies,-- and the comma (,) after "avoids" should be deleted.
Column 3, line 24, "extrusing" should be --extruding--.
Column 7, line 1, "50" should be --50'--.
Column 7, line 26, "50" should be --50'--.

Signed and sealed this 27th day of November 1973.

(SEAL)
Attest:

EDWARD M. FLETCHER, JR.　　　　RENE D. TEGTMEYER
Attesting Officer　　　　　　　　Acting Commissioner of Patents